United States Patent [19]

Huang

[11] Patent Number: 5,333,342
[45] Date of Patent: Aug. 2, 1994

[54] MULTI-PURPOSE SNOW SCRAPPER

[76] Inventor: Tien-Tsai Huang, No. 4, Lane 30, Wu-Chang St., Pan Chiao City, Taiwan

[21] Appl. No.: 6,024

[22] Filed: Jan. 15, 1993

[51] Int. Cl.⁵ .................. A47L 13/02; B25F 1/00; B60C 23/02
[52] U.S. Cl. .................. 15/105; 7/100; 7/164; 7/170; 30/169; 33/203.11; 33/836; 73/146.8; 15/236.02; 15/236.08
[58] Field of Search .......... 15/105, 236.01, 236.02, 15/236.05, 236.08, 236.09; 7/100, 164, 170; 362/99, 119; 30/169, 172; 73/146.8, 714; 33/836, 203.11, 542.1

[56] References Cited

U.S. PATENT DOCUMENTS

| | | | |
|---|---|---|---|
| 3,380,296 | 4/1968 | Malanga | 15/105 |
| 3,655,960 | 4/1972 | Andree | 362/119 |
| 3,696,668 | 10/1972 | Patrick | 33/836 |
| 4,137,561 | 1/1979 | Andree | 362/119 |
| 4,275,476 | 6/1981 | Hopkins | 15/236.02 |
| 4,305,175 | 12/1981 | Burgess, Jr. | 15/236.02 |
| 4,481,690 | 11/1984 | Simmons | 15/236 R |
| 4,662,947 | 5/1987 | Hopkins | 134/6 |
| 4,719,660 | 1/1988 | Hopkins | 15/236.02 |
| 4,770,712 | 9/1988 | Hopkins | 15/105 |
| 4,813,458 | 3/1989 | Jacobucci | 15/236.02 |
| 4,873,864 | 10/1989 | Huang | 73/146.8 |
| 4,881,291 | 11/1989 | Ellis | 30/169 |
| 4,884,175 | 11/1989 | Weng | 362/119 |
| 5,095,573 | 3/1992 | Henke et al. | 15/105 |
| 5,148,704 | 9/1992 | Tsai | 73/146.8 |

FOREIGN PATENT DOCUMENTS

| | | | |
|---|---|---|---|
| 1349402 | 12/1963 | France | 73/146.8 |
| 2436697 | 5/1980 | France | 7/100 |

Primary Examiner—Timothy F. Simone
Assistant Examiner—Randall E. Chin
Attorney, Agent, or Firm—Panitch Schwarze Jacobs & Nadel

[57] ABSTRACT

A snow scraper includes transparent main body with a hand grip portion and a blade formed on one end of the hand grip portion. The blade has a front portion which is provided with an inclined shoveling edge and a plurality of claws. The snow scraper further has a pressure indicating unit, a tire tread measuring unit and a light bulb unit and a magnifying glass.

7 Claims, 6 Drawing Sheets

# MULTI-PURPOSE SNOW SCRAPPER

BACKGROUND OF THE INVENTION

1. Field of the Invention

The invention relates to a snow scraper, more particularly to a multi-purpose snow scraper for a car.

2. Description of the Related Art

FIG. 1 shows a conventional snow scraper which is used to scrape the snow that gathers around the wheels of a car. As best illustrated, the scraper includes a hand grip portion (91) and a blade (92) which is disposed on one end of the hand grip portion (91). The blade (92) has a front portion that is provided an oblique edge (921) for shoveling the snow and a plurality of claws (922) for scrubbing the snow from the wheels.

As a precautionary measure, a driver must check the pressure in the tire and the depth of the tread on the tire in order to prevent any unfortunate accident from happening due to insufficient tire pressure and wearing of the tire. If the checking operation is carried out at night, a torch light becomes a necessary tool. In order to facilitate the removal of snow and the conduction of the checking operation, the scraper, the pressure indicating unit, the tread depth measuring rod and the torch light are indispensable. All of these instruments would occupy a lot of space in the car, and misplacement or lack of one of the above-mentioned instruments would hinder the snow removing and checking operations.

SUMMARY OF THE INVENTION

The main objective of the present invention is to provide a multi-purpose snow scraper which is provided with a torch light unit, a pressuring indicating device and a tire tread depth measuring device.

According to the present invention, the multi-purpose snow scraper includes a transparent main body which is made of acrylic and which has a hand grip portion and a snow blade that is formed integrally with and that is disposed on one end of the hand grip portion. The blade is provided with a shoveling edge and a plurality of claws at a front portion, a recess that is formed on an upper surface of the blade and that extends from the front portion to the hand grip portion, and a cavity that is formed on a lower surface of the blade. A light bulb is provided at an intermediate portion of the transparent main body. The hand grip portion is further provided with a dry cell receptacle which receives a cell unit therein and which connects electrically the cell unit and the light bulb. The hand grip portion further has an elongated bore that extends through the hand grip portion and that is communicated with the cavity of the blade. A pressure indicating device is provided in the elongated bore. The front portion of the blade has a through bore which communicates the recess and an exterior of the main body and which permits a pointed section of a tire tread measuring rod to extend to the exterior of the main body when the tire tread measuring rod is provided slidably in the recess of the blade. The hand grip portion is further provided with an air releasing rod for releasing the pressure from the inflated tire upon detection of an over inflated condition and a magnifying glass for map reading purposes.

BRIEF DESCRIPTION OF THE DRAWINGS

Other features and advantages of the present invention will become more apparent in the following detailed description with reference to the accompanying drawings, in which.

DETAILED DESCRIPTION OF THE PREFERRED EMBODIMENT

Figure 1:
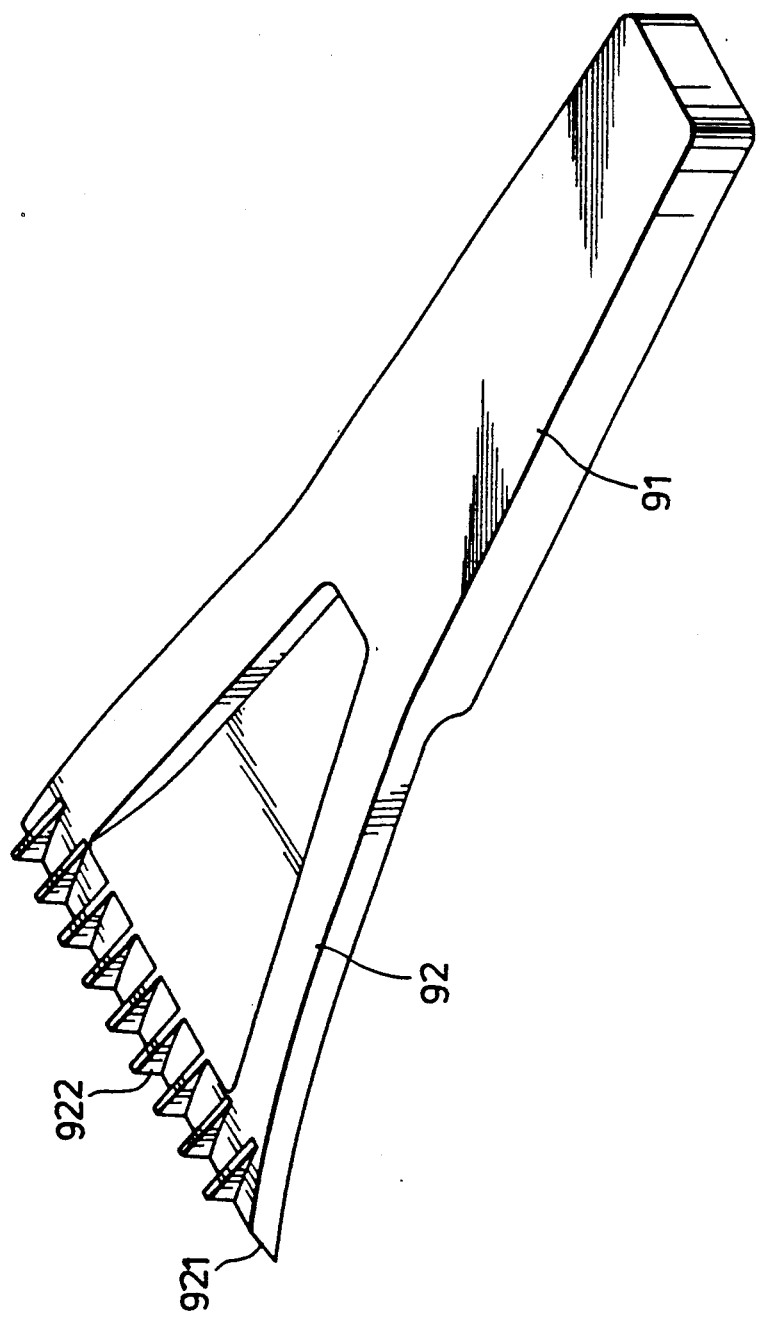
FIG. 1 is a perspective view of a conventional snow scraper.
Figure 2:
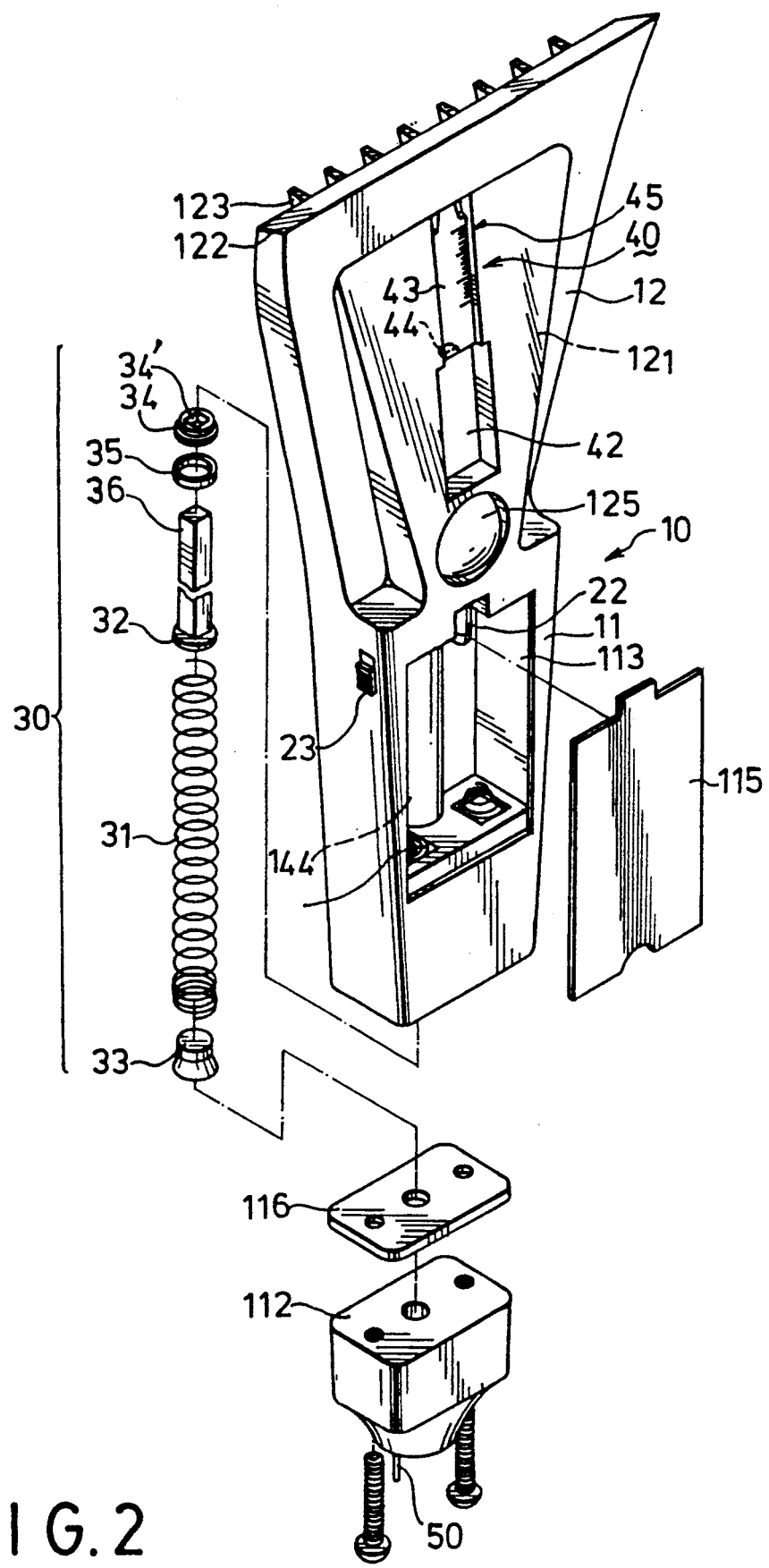
FIG. 2 is an exploded view of a multi-purpose snow scraper of the present invention.
Figure 3:
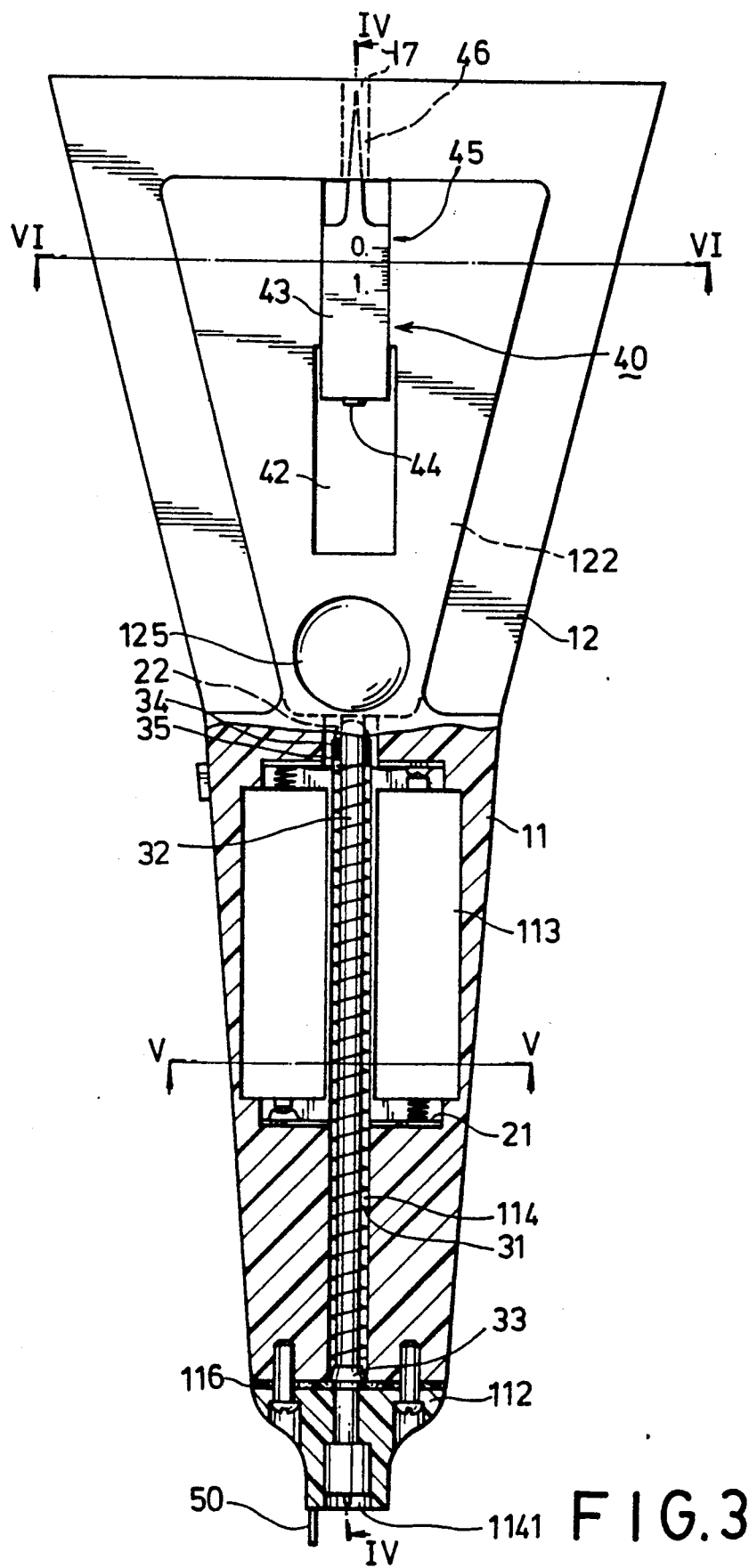
FIG. 3 is a top view of the multi-purpose snow scraper of the present invention with the hand grip portion illustrated in cross section.

Referring to FIGS. 2 and 3, a multi-purpose snow scraper according to the present invention is shown to comprise a transparent main body (10) which is made of acrylic and which has a hand grip portion (11) and a blade (12) that is formed integrally with one end of the hand grip portion (11).

The blade (12) has an oblique edge (122) and a plurality of claws (123) formed at a front portion thereof. The oblique edge (122) is used to shovel the snow, while the claws (123) are used to scrub the snow from the wheels.

Figure 4:
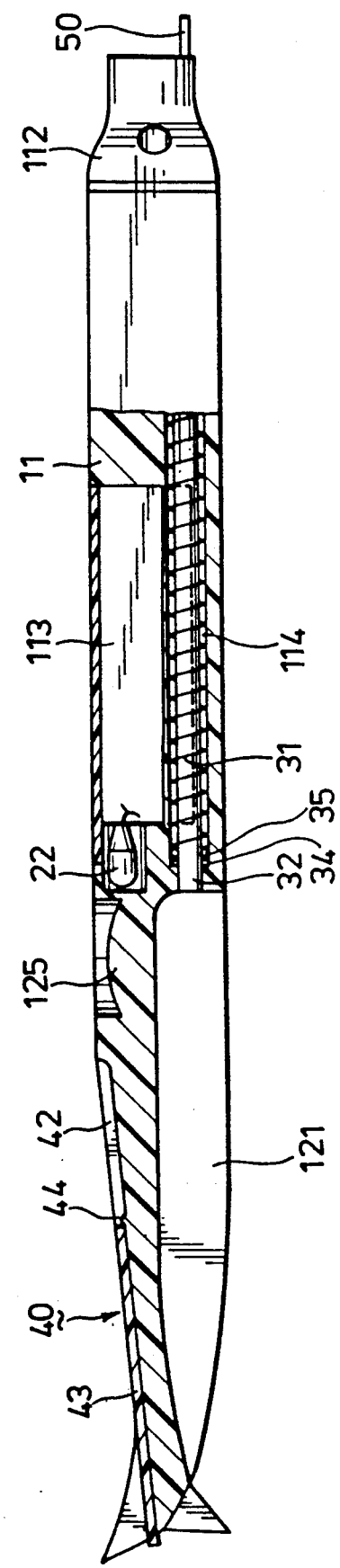
FIG. 4 is a cross-sectional view of the multi-purpose snow scraper of FIG. 3, taken along the line IV—IV.
Figure 5:
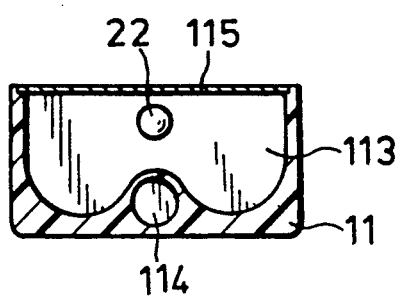
FIG. 5 is a cross-sectional view of the multi-purpose snow scraper of FIG. 3, taken along the line V—V.
Figure 6:
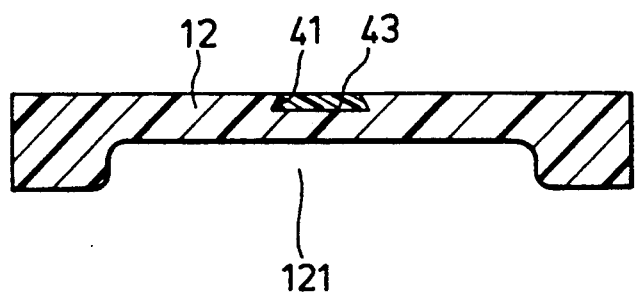
FIG. 6 is a cross-sectional view of the multi-purpose snow scraper of FIG. 3, taken along the line VI—VI.
Figure 7:
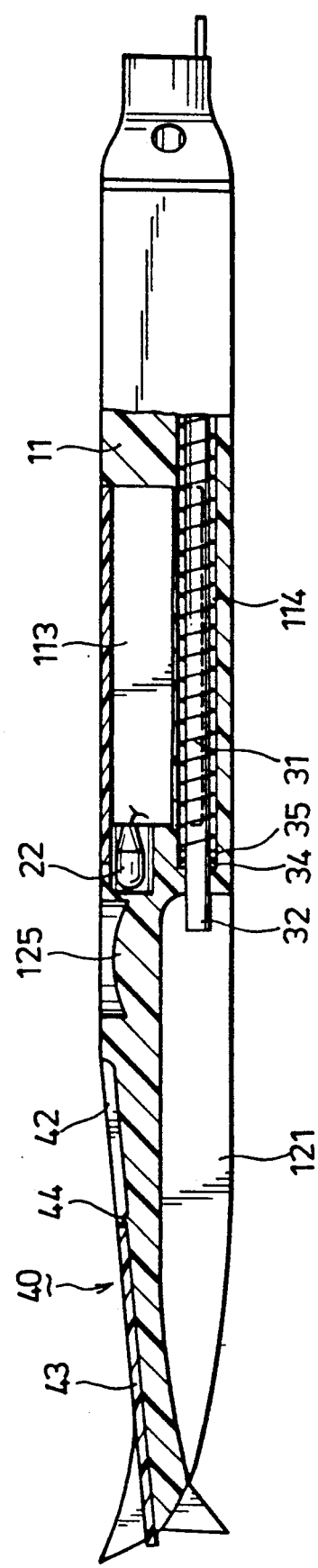
FIG. 7 is a cross-sectional view of the multi-purpose snow scraper of the present invention, illustrating the pressure indicating unit in operation.

Referring to FIGS. 4 and 6, the blade (12) has an upper surface that is provided with a recess (40) which has a bottom (42) and which extends from the front portion of the blade (12) to the hand grip portion (11) so as to receive a tire tread depth measuring rod (43) slidably therein. The bottom (42) inclines gradually downward with respect to the front portion of the blade (12). The tire tread depth measuring rod (43) has marked scales thereon. A scale indicator (45) points to "zero" on the tread depth measuring rod when the former is not in use. The tread depth measuring rod (43) has an enlarged bottom (41) that fits in the recess (40) in a dovetail connection, as shown in FIG. 6. The front portion of the blade (12) has a through hole (47) which is communicated with the recess (40) and which permits a pointed section (46) of the tread depth measuring rod (43) to extend through the transparent main body (10) as illustrated in FIG. 3. The pointed section (46) of the measuring rod (43) is used to measure the depth of the tread of a tire. A protrusion (44) extends upward from the bottom (42) to prevent the untimely removal of the tread measuring rod (43) from the recess (40) when the scraper is held in an upright position.

The transparent main body (10) is further provided with a magnifying glass (125) which is necessary for reading maps. A light bulb (22) is provided on the transparent main body (10) at an intermediate portion thereof.

A cavity (121) is formed in the lower surface of the blade (12). The hand grip portion (11) has a dry cell receptacle (113) which receives a cell unit and which connects electrically the light bulb (22) and the cell unit via a switch button (23). A cover (115) is disposed on the receptacle (113) to shield the cell unit. An elongated bore (114) is formed through the hand grip portion (11)

and the rear portion (112), is communicated with the cavity (121) and is aligned with the light bulb (22) when viewed from the top of the transparent, main body (10). The hand grip portion (11) further has a rear portion (112) which is connected thereto by means of screws. A rubber sealing plate (116) disposed between the hand grip portion (11) and the rear portion (112).

A pressure indicating unit (30) includes an air inlet valve (1141) provided securely at a first end of the elongated bore (114). A block member (34) is provided securely at a second end opposite to the first end of the elongated bore (114) and has a through hole which communicates the elongated bore (114) and the cavity (121). A piston member (33) is disposed movably in the elongated bore (114) adjacent to the inlet valve (1141). An indicating rod (32) is disposed movably in the elongated bore (114) and moves with the piston member (33). A compression spring (31) is sleeved around the indicating rod (32) and has one end which abuts against the block member (34) so as to bias the piston member (33) towards the inlet valve (1141) thereby sealing the inlet valve (1141) hermetically. The block member (34) has a through-hole (34 '). The indicating rod (32) includes an extension (36) which is adapted to extend into the cavity (121) through the through-hole (34') of the block member (34). A rubber sealing ring (35) is provided around the indicating rod (32) at the second end of the elongated bore (114) in order to seal the second end hermetically. When measuring the pressure in a tire, the inlet valve (1141) of the pressure indicating device (30) engages to the valve of the tire to be measured. The pressure from the tire moves the piston member (33) towards the second end of the elongated bore (114) thereby compressing the compression spring (31) and permitting the extension (36) to protrude out of the elongated bore (114) and extend into the cavity (121). The amount of pressure in the inflated tire is obtained by determining the degree of protrusion of the extension (36). The light bulb (22) provides sufficient visibility if the operation is carried out at night. If an over inflated condition has been detected, air in the tire can be released so as to reduce the tire pressure to a safer level. For this purpose, a pressure releasing rod (50) is provided at the rear portion (112).

It has been shown that the multi-purpose snow scraper of the present invention includes several other devices that are necessary for checking the status of the tires of a car. This facilitates the driver in many ways, and therefore, the features and objectives of the present invention are correspondingly obtained.

While a preferred embodiment has been described and explained, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A multi-purpose snow scraper, comprising:
    a transparent main body having an elongated hand grip portion with a first end and a second end;
    a blade member formed integrally with and extending from said first end of said hand grip portion, said blade member having an upper surface, a lower surface, and a front portion having an inclined shoveling edge and a plurality of claws, said blade member further having a recess which is formed in said upper surface and which extends from said front portion to said hand grip portion, and a cavity which is formed in said lower surface of said blade member and which extends from said front portion to said hand grip portion;
    a light bulb intermediate said hand grip portion of said transparent main body and said blade member;
    said hand grip portion further including a dry cell receptacle for receiving a cell unit therein and for connecting electrically said cell unit and said light bulb, and an elongated bore which extends through said hand grip portion so as to communicate with said cavity; and
    a pressure indicating unit provide din said elongated bore wherein a portion of said pressure indicating unit is visible to a user by way of said cavity and said recess.

2. The multi-purpose snow scraper as defined in claim 1, wherein said elongated bore has a first end adjacent to said hand grip portion second end and a second end opposite said bore first end, said pressure indicating unit includes an air inlet valve provided securely at said first end of said elongated bore, a block member which is provided securely at said second end of said elongated bore said block member having a through hole that communicates said elongated bore and said cavity, a piston member slidably provided in said elongated bore adjacent to said inlet valve, a measuring rod provided in said elongated bore and which moves with said piston member, and a compression spring which is sleeved around said measuring rod and which biases said piston to close said inlet valve hermetically, said measuring rod having a section which extends into said cavity through said through hole of said block member when pressurized air enters said inlet valve.

3. The multi-purpose snow scraper as defined in claim 2, wherein said pressure indicating unit further comprises an air releasing rod provided at said second end of said hand grip portion.

4. The multi-purpose snow scraper as defined in claim 1, wherein:
    said blade member further has a through bore formed therethrough at said front portion thereof and communicated with said recess; and
    said snow scraper further comprises a tire tread depth measuring rod having a pointed section, said rod being slidably disposed in said recess, wherein said rods extends out of said transparent main body through said through bore of said blade member for measuring tire tread depth.

5. The multi-purpose snow removing scraper as defined in claim 1, wherein said transparent main body is further provided with a magnifying glass wherein said magnifying glass is integral with said transparent main body and disposed between said bulb and said blade member.

6. A multi-purpose snow scraper, comprising:
    a transparent main body having an elongated hand grip portion the hand grip portion having a first end and a second end;
    a blade member formed integrally with and extending from said first end of said hand grip portion, said blade member having an upper surface, a lower surface, and a front portion having an inclined shoveling edge and a plurality of claws, said blade member further having a recess which is formed in said upper surface and which extends from said front portion to said hand grip portion, and a cavity which is formed in said lower surface of said blade member and which extends from said front portion to said hand grip portion;

a light bulb provided intermediate said hand grip portion of said transparent main body and said blade member;

said hand grip portion being provided with a dry cell receptacle to receive a cell unit therein and to connect electrically said cell unit and said light bulb, and an elongated bore which extends through said hand grip portion so as to communicate with said cavity;

a pressure indicating unit provided in said elongated bore, wherein said pressure indicating unit is visible to a user by way of said cavity and said recess; and a magnifying glass integral with said transparent main body and disposed between said light bulb and said blade member.

7. The multipurpose snow scraper in accordance with claim 6 wherein said blade further has a through bore formed therethrough at said front portion thereof and communicated with said recess;

said snow scraper further comprises a tire tread depth measuring rod having a pointed section, said rod being slidably disposed in said recess, wherein said rod extends out of said transparent main body through said through bore of said blade for measuring tire tread depth; and said pressure indicating unit further comprises an air releasing rod provided at said second end of said hand grip portion.

* * * * *